March 16, 1965 W. A. BARY 3,173,634
CLOSED TRACK AIRPORT
Filed Nov. 5, 1963
FIG. I.
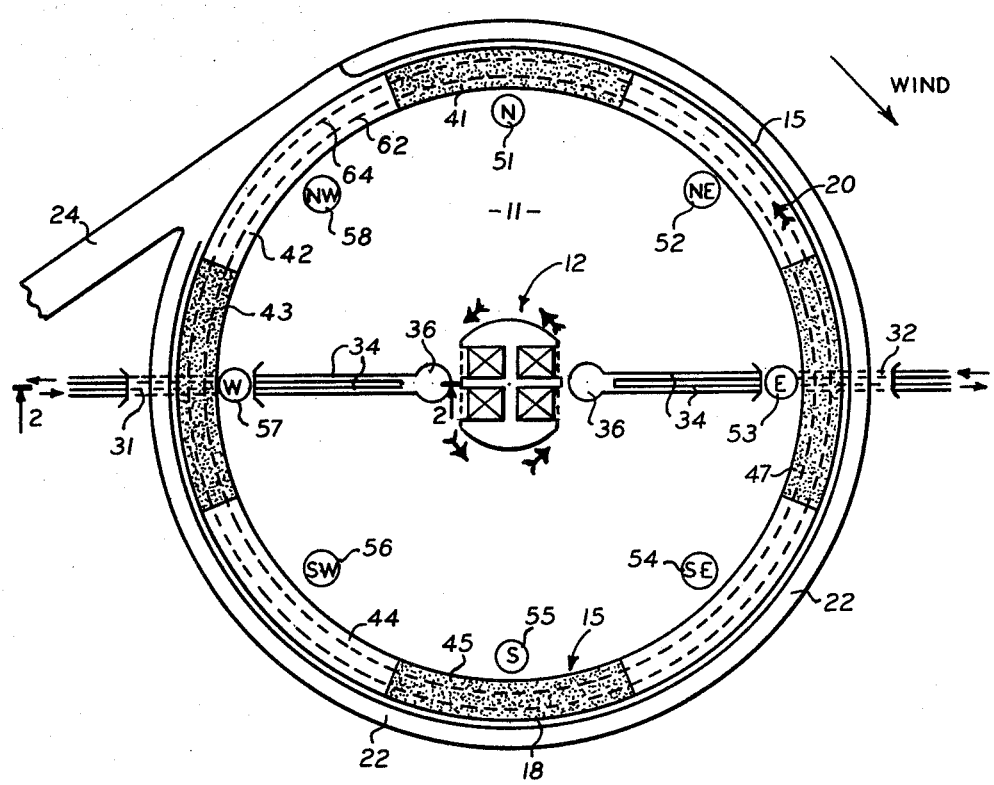
FIG. 2.
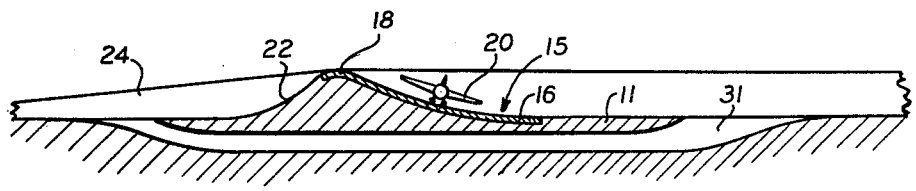
INVENTOR
Waldemar A. Bary
BY
ATTORNEYS.

United States Patent Office 3,173,634
Patented Mar. 16, 1965

3,173,634
CLOSED TRACK AIRPORT
Woldemar A. Bary, R.D. 1, East Stroudsburg, Pa.
Filed Nov. 5, 1963, Ser. No. 321,521
4 Claims. (Cl. 244—114)

After 1927, when Lindbergh crossed the Atlantic, world aviation underwent a radical change. Through following years a new and firm trend was set and maintained to fly faster and faster and by aircraft of ever increasing gross weights. This required not only a continuous increase of power, but aircrafts of small wing area, hence with an extremely high wing loading. Thus resulting in a most dangerously high take-off and landing speed.

On account of those high speeds, present airports are compelled to have immense and costly open spaces to accommodate several runways, running at angles to each other. These runways are straight, narrow, well paved and have to be of very great length (6,000 to 12,000 feet). And, due to their size, most large airports are bound to be located far from the area to be served. In the past most runways of major airports had to be extended, and, unless different kind of aircraft are used, will have to be further extended in the future.

Take-off, even on a most modern and long runway, at now prevailing high speeds of large and heavy loaded aircraft has always a degree of grave hazard. There is the risk of not attaining on time a high enough speed for a safe lift with a sufficiently steep climb before the runway's end has been reached. A crucial moment for the pilot—"the point of no return."

Furthermore, on account of a limited distance for the plane's run, the take-off as a rule has to be made with all engines wide open. Even for a short take-off time, to run an engine at its ultimate overload is a risky strain on the engine and the thunderous roar of several wide open engines is a real curse to surrounding populated areas.

At landing even a greater hazard exists; when the pilot at a too high speed is over-shooting the entering end of the runway and is short of distance to bring the plane to a safe stop. Here again is the crucial moment for the pilot—"the point of no return," when he might face a crash. Indeed the speed and run after landing are now reduced by various special devices, which are most helpful at normal landings, but certainly will not prevent a disaster at a poor, bad weather landing. Bad weather, mechanical trouble and human errors remain a potential menace.

Regardless how much further extended, a great straight runway has its inherent crucial end with the always existing enduring threat to the pilot of a possible disaster. Unfortunately, the statistics show, that short of distance, take-off and landings account for far too many airport tragedies.

It is an object of this invention to provide an aircraft landing field with a runway that has no end. This invention provides a closed circuit circular track which, being endless, has no threatening crucial runway ends. Instead, the airport consists of a large, flat and open area surrounded by a wide and well paved banked ring-track. The term "Ring-Track," used hereafter, is to cover any "closed circuit" track of the shape of a "circle," "ellipse" or an "oval," however, a perfect geometrical "circle" is preferred.

A heavy plane traveling at a high speed on a ring-track is under a strong effect of centrifugal forces. Those forces are growing in direct proportion with the mass of the plane and with the square of speed, but are proportionally reduced with the increase of the track's radius.

(Centrifugal force $= M \cdot V^2 / R$)

Hence, for a plane of a gross weight of about 25,000 lbs. and more, traveling on a curved path at a speed of about 100 m.p.h. and over, to neutralize the effect of centrifugal forces and to steer the plane on such a curved path the following conditions are paramount:

(1) The ring curvature radius is preferably between 1,500 to 3,000 feet.

(2) The track is preferably 200 to 300 feet wide and has an easy slope apron around the banking wall.

(3) To suit the variation in speeds the track banking has a gradually increasing slope angle reaching at the track's periphery a superelevation in foot per feet of .15 to .20.

(4) The inner track edge is preferably flush with the inside ring area.

(5) Application of rudder and ailerons, the same as when circling in the air, will steer the plane on the curved path, and also will counteract the centrifugal forces.

(6) When the plane is on the track, by switching the flaps control from a joint to a separate or differential setting, a forceful anti-centrifugal force can be obtained.

This invention can be used with conventional blind landing electronic apparatus for guiding the plane along a straight course until touchdown. From there on, a conventional radar can be used to guide the aircraft on the ground on a circular course equipped with suitable reflectors to reflect back the usual radar beam to the screen aboard the aircraft. The same radar guidance can be used for take-off until the aircraft becomes airborne.

Take-off and landing is made into the wind, and this can be made at any required point of the ring's periphery. Likewise, any part of the inner track edge is available for plane rolling on the ground in and out of the inside ring area. However, the high banking track enclosure precludes all other land communication between the inner ring area and the outside, hence, other special provisions are needed.

With a 3,000 to 6,000 feet outer ring diameter, the inner airport area will comprise up to 450 acres of open and flat land, more than ample for the location in its center of all necessary airport premises, its operation facilities and a space for automobile parking. Such an arrangement, as stated above, requires the following special communication provision with the outside: Several modern underground tunnels are permanently open for pedestrian, automobiles, trucks, buses and traffic of other relatively small vehicles. Occasional and emergency passage of extra large vehicles, especially wide wing span aircraft can be made by way of tractor towing over the track banking and the slow sloping apron around the ring. The apron also lessens the unfortunate results of a bad landing.

Of course at special local requirement, some or even most airport facilities may be located outside the ring area, leaving in the inside only pavilions for boarding and debarking of passengers and freight with some provision for plane service.

Other object, features and advantages of the invention will appear or be pointed out as the description proceeds.

In the drawing, forming a part hereof, in which like reference characters indicate corresponding parts in all the views;

FIGURE 1 is a plan view showing an airfield made in accordance with this invention; and FIGURE 2 is an enlarged sectional view taken on the line 2—2 of FIGURE 1.

The airfield shown in FIGURE 1 includes a ring area or center area 11 containing a complex of buildings 12 for use by the aircraft that land and take off from the field. These buildings may include the control tower, hangers, baggage storage and freight storage facilities, waiting rooms for passengers and any other facilities required for airfield use.

Surrounding the center area 11 is a circular runway 15. This runway is covered by a hard surface, preferably the usual paving, indicated by the reference character 16 in FIGURE 2. At its inner end, the runway 15 is preferably flush with the surface of the center area 11; but the runway 15 slopes upwardly with a progressively increasing angle of bank to a maximum angle at an outer peripheral portion 18 of the runway 15. With a runway width of 300 feet, as indicated in FIGURE 2, the superelevation at the outer edge portion 18 amounts to 60 feet and the angle of bank at the outer edge portion 18 may be as high as 30° to the horizontal.

The progressive change in bank of the runway 15 as it extends radially outward is gradual enough so that the aircraft having the widest and lowest wing spans do not run any risk of touching their wing tips on the runway when the aircraft is grounded and rolling along the surface of the runway on the aircraft wheels. FIGURE 2 shows an aircraft 20 on the runway 15.

Beyond the outer edge portion 18 of the runway 15 there is an apron 22 sloping downwardly at a steeper angle of bank than the runway 15 and in the illustrated construction, the apron 22 has a progressively decreasing slope as it extends outwardly. However, the outer edge portion 18 of the runway 15 merges with the apron 22 along a fair curve so that any plane which runs over the outer edge portion 18 along a spiral course can travel along a similar course down the apron 22.

The apron 22 is not intended for bringing aircraft into and out of the field however because providing a gradual slope for this purpose, would enormously increase the amount of fill required for the apron. The surface of the apron is, therefore, merely an emergency surface which is not intended to be used for the normal transportation of planes into and out of the airfield on the ground. For that purpose, there is a ramp 24, shown in FIGURE 1, which slopes upwardly to the top of the apron 22 and which meets the upper or outer edge portion 18 of the runway 15 with a gradual slope for convenient towing of aircraft to and from the outside of the runway 15. The slope of the ramp 24 is preferably less than the slope resulting from the superelevation of the runway 15 and the incline of the ramp 24 can be made as gradual as desired depending upon the length of distance available for the ramp.

One or more tunnels 31 and 32 extend under the runway 15, there being two tunnels indicated in FIGURE 1, and the tunnel 31 of FIGURE 1 being shown in section in the FIGURE 2. There are roads 34 extending through the tunnels 31 and 32 and these roads 34 preferably have circles or turnarounds 36 at their inner ends at the building complex 12.

The runway 15 is preferably divided into a plurality of sections. The runway illustrated has eight sections indicated by the reference characters 41–48. Each of these sections extends for substantially the same angular distance around the runway circle and with eight sections, the angular extent of each section is 45°. The sections are distinguished from one another, when viewed from the air, by virtue of the different color paving. Alternate sections are paved with material of one color and the other sections are paved with material of another color. There are signs or legends 51–58 adjacent to the sections 41–48, respectively, for identifying the sections when communicating between an aircraft and the control tower. For example, the control tower may instruct an approaching aircraft to touch down on section NE, this being the most advantageous approach because of wind conditions.

As a further guide to approaching pilots, the runway 15 is preferably equipped with circular markings 62 and 64 located at different radial distances from the inside to the outside of the runway. These markings 62 and 64 extend around portions of the runway 15 which have certain predetermined angles of bank. For a plane approaching at a certain landing speed, it may be desirable to land on the circle 64 in order to have the angle of bank of the tract counteract centrifugal force corresponding to the landing speed. For another plane having a different landing speed, the circle 62 may be ideal. For still another pilot, the instructions may be to land halfway between the circles 62 and 64. As the speed of the plane decreases on the runway, the pilot will follow a spiral course toward the inside of the runway so that the slope of the runway decreases to compensate for decrease in speed. Once the aircraft is on the runway, the pilot is able to move radially on the runway along a spiral course as necessary judging by his own consciousness of the centrifugal force acting on his plane, but this of course would not be possible before the plane has landed. Hence the markings 62 and 64 are useful in bringing the aircraft down at the proper radial location on the landing strip when initially touching down.

For take-off the pilot enters the runway 15 at any convenient point from the inside ring area 11. Then, having an endless path to run on, he rolls his plane as long and for as many track loops as the type of craft and its particular loading at the time should require. And only when a high enough speed for a steep and safe climb is attained, does he take-off into the wind at a runway track section 41–48 assigned by the control tower.

Having an endless path to run on, the pilot is not liimted to a predetermined run length to reach the needed lifting speed for a safe take-off. Hence, the required plane acceleration will be obtained with more time and at a greater distance covered, but without the risk of dangerously racing the engines to their ultimate power that might result in an engine failure with a crash. Also, the take-off is made with less than the usual excessive engine roar, so perturbing to the neighborhood.

On a straight runway, once the pilot has started with his engines wide open, he has passed "the point of no return," whereas on a ring-track he always has a chance of a safe return for engine recheck. Also, with the available margin of power, the use of engine muffling devices becomes possible, as the power for a take-off is no more than that required for a climb in normal flight.

For landing the pilot first circles in the air over the track or runway 15 to verify his proper banking angle. Then at his lowest possible speed and with a differentially adjusted flaps setting he lands facing the wind on the ring section designated for him by the control tower.

Landing on a wide track with a large enough diameter on a track section of about 2,000 feet long is not much of a problem, especially with no danger of over-shooting the section. Once on the track the pilot rolls the plane as long and for as many loops as necessary until he gradually comes to a stop, leaving thereafter into the inside ring area 11. Obviously no special speed retarding devices are needed, except the usual wing flaps and regular wheel brakes, and the latter are not exposed to dangerous extra strain and abuse on tires.

Since the plane can enter and leave the same ring-track flying always into the wind, this invention eliminates the need for several differently directed runways or several ring-tracks. Except, of course, when traffic saturation would justify one or more extra ring units. As to the land requirement for one ring-unit, it is only a small fraction of the land used today for conventional airports.

The capacity of a one-ring airport is the same as that of a conventional multi-runway airport, where, according to wind direction, only one runway can be used at a time. Also in both type of airports only one plane at a time should use the runway.

Furthermore, it should be noticed, that at high altitude where faster landings and longer take-off are needed the ring-track airport of this invention is of a special value.

This invention obtains important improvements over the circular aircraft track disclosed in the Backus Patent 1,388,319, issued August 23, 1921. In that patent a circular track was provided, but without any kind of banking. Backus suggested that the trackway be preferably substantially two miles in circumference. This would be satisfactory for very small, lightly loaded and slow landing planes of the time that the patent was issued. However, a circular track of the above size and for small, lightly loaded and slow landing planes would be unnecessary since such planes can land in open fields a quarter mile long and such fields would provide more than enough for safe take off and landing. To operate on a track, such as shown in the Backus patent, with planes of present day size, speed and wing loading would be completely out of the question.

There is an enormous difference between the aircraft prior to the famous Lindbergh flight and the air transport in operation today. The maximum gross weight of the old time aircraft was around 15,000 pounds, and today it is over 300,000 pounds, or over twenty times greater; and the landing and take-off speeds are three times as high as formerly, with nine times greater centrifugal force effect. This means that two hundred times centrifugal force would be exerted when traveling on a circular track today as compared with the earlier planes of the pre-Lindbergh era. Hence the track suggested by the Backus patent is entirely unsuitable for modern day use. Prior art patents showing banked tracks are not applicable for use by present day aircraft of the speed and loads as specified above.

This invention provides a track which overcomes the problems presented by the heavier aircraft, higher speeds and greater centrifugal force. And at the same time makes possible the use of the same banked track by different kinds of aircraft which land at different speeds and which require the counter balancing of different amounts of centrifugal force.

The preferred embodiment of the invention has been illustrated and described, but changes and modifications can be made and some features can be used in different combinations without departing from the invention as defined in the claims.

What is claimed is:

1. An aircraft landing field including a center area having a complex used by the aircraft that will land on and take off from the field, an endless track surrounding the center area and transversely banked from substantially the level of the center area and to a superelevation with a progressively greater angle of bank toward the outside of the track, a downwardly sloping apron on the outside of the track, and a curved ground contour at which the track merges with the apron, the curved ground contour having an elevation, within a radial distance equal to the wheel tread of aircraft using the field, substantially less than the ground clearance of the aircraft between its wheels, whereby the aircraft can cross the curved contour on a spiral path having only a small radial component along a course spiralling out from the track.

2. An aircraft landing field including a center area having a complex used by the aircraft that land on and take off from the field, an endless track surrounding the center area and transversely banked from substantially the level of the center area and to a superelevation with a progressively greater angle of bank toward the outside of the track, a tunnel extending from the center area under the track to a location outside of the track for ingress and egress of passengers and/or freight to the center area, and a downwardly sloping area outside of the track and down which the aircraft from the track can travel after passing over the high side of the track.

3. An aircraft landing field including a center area having a complex used by the aircraft that will land on and take off from the field, an endless track surrounding the center area and transversely banked from an inner portion that is substantially horizontal and at substantially the level of the center area and to a superelevation with a progressively greater angle of bank toward the outside of the track, the bank of the track increasing towards its outer edge progressively up to approximately 30° of angle to the horizontal, a downwardly sloping area on the outside of the track, and a radially extending area of gradually reversing curvature over which an aircraft passes from the high side of the track.

4. An aircraft landing field comprising a substantially annular and endless track covered by a hard surface and having a banked contour that becomes progressively steeper toward the outer radial limit of the track, and marking on the track visible to an approaching aircraft pilot for indicating a line along which an aircraft traveling at a given speed should land, the marking being a substantially circular line spaced from both the inner and outer radial limits of the annular track at a transverse location where the bank of the track surface compensates the centrifugal force of an aircraft traveling at the landing speed indicated by the said marking, and characterized by the superelevation of the track toward the outside of the track being up to 30° with respect to the horizontal, and by the track having sections of approximately 45° circumferential extent with each successive section differently colored to identify it for compliance with central control tower directions when landing, and further characterized by each section also having legend indications on the ground for identifying it, and by a center area which is surrounded by the track and in which there is a complex of buildings used by the aircraft that land and take off from the field, an apron extending downwardly from the outside of the track and which is joined to the outer edge of the track by a surface of curved contour over which the wheels of an aircraft can travel when the aircraft moves along a course spiralling out from the track, a ramp extending downwardly from the outer end of the track at one location around the circumference of the track, the ramp being of much less slope than the apron, and a tunnel extending under the track and apron at a location different from the location of the ramp.

References Cited by the Examiner

UNITED STATES PATENTS 2,400,841    5/46    Rogers _____ 244—114

OTHER REFERENCES

Flight, Dec. 20, 1957, pages 963, 964.
Aero Digest, May 1, 1944, pages 56–58.

FERGUS S. MIDDLETON, *Primary Examiner.*

ANDREW H. FARRELL, MILTON BUCHLER,
*Examiners.*